US012598220B2

(12) United States Patent
Khan et al.

(10) Patent No.: US 12,598,220 B2
(45) Date of Patent: Apr. 7, 2026

(54) RCS PROXY SYSTEM AND METHOD FOR PSAP SESSIONS

(71) Applicant: VERIZON PATENT AND LICENSING INC., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Lewisville, TX (US); Gaurav Patel, Mckinney, TX (US); Shawn Pugh, Easton, PA (US); Shujaat Ali Siddique, Hillsborough, NJ (US); Daniel L. Walker, Wall Township, NJ (US); John Cao Vinh Nguyen, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 18/166,658

(22) Filed: Feb. 9, 2023

(65) Prior Publication Data

US 2024/0275824 A1 Aug. 15, 2024

(51) Int. Cl.
*H04L 65/1016* (2022.01)
*H04L 65/1073* (2022.01)
(Continued)

(52) U.S. Cl.
CPC ...... *H04L 65/1016* (2013.01); *H04L 65/1073* (2013.01); *H04L 65/1104* (2022.05); *H04L 69/24* (2013.01)

(58) Field of Classification Search
CPC ......... H04W 4/12; H04W 4/90; H04W 60/00; H04W 76/50; H04W 4/02; H04W 12/069;
(Continued)

(56) References Cited

U.S. PATENT DOCUMENTS

| 8,638,907 B1* | 1/2014 | Schumacher | ........... H04W 4/90 455/404.1 |
| 9,116,223 B1* | 8/2015 | Martin | ...................... G01S 5/02 |

(Continued)

*Primary Examiner* — Dustin Nguyen

(57) ABSTRACT

Disclosed are systems and methods for a Rich Communication Services (RCS) Proxy that can be enabled via a novel network element, which provides functionality for establishing and enabling emergency RCS communications. The disclosed RCS framework can facilitate simultaneous voice and chat features for an emergency services caller. With Session Initiation Protocol (SIP and Hypertext Transfer Protocol Secure (HTTPS) interfaces, the disclosed RCS framework can function to automatically establish an emergency chat session for RCS-capable devices. For devices that are not configured with RCS capabilities, the disclosed framework can function to provide a uniform resource locator (URL) via a short message/messaging service (SMS) message, such that via interaction with the URL, an internet session with the PSAP can be established. Accordingly, the disclosed RCS framework provides functionality for aligning voice and chat interactions between conversing entities (e.g., a user caller and a dispatcher at the PSAP handling the incoming call).

17 Claims, 7 Drawing Sheets

(51) Int. Cl.
 *H04L 65/1104* (2022.01)
 *H04L 69/24* (2022.01)
(58) Field of Classification Search
 CPC ......... H04W 64/00; H04W 4/14; H04W 4/48;
 H04M 3/42221; H04M 3/42391; H04M
 3/42357; H04M 3/567; H04M 3/5116;
 H04L 67/104; H04L 67/146; H04L
 61/2564; H04L 69/164; G01S 5/02
 See application file for complete search history.

(56) References Cited

U.S. PATENT DOCUMENTS

| | | | | |
|---|---|---|---|---|
| 10,524,106 | B1 * | 12/2019 | Skertich | H04M 3/42221 |
| 11,394,827 | B1 * | 7/2022 | Manzanillo | H04M 3/5116 |
| 2005/0201528 | A1 * | 9/2005 | Meer | H04W 76/50 |
| | | | | 379/37 |
| 2007/0060097 | A1 * | 3/2007 | Edge | H04L 69/164 |
| | | | | 455/404.1 |
| 2009/0156237 | A1 * | 6/2009 | Hwang | H04M 3/42357 |
| | | | | 455/466 |
| 2009/0248822 | A1 * | 10/2009 | De Vriendt | H04L 67/104 |
| | | | | 709/225 |
| 2010/0069099 | A1 * | 3/2010 | Dunn | H04W 4/12 |
| | | | | 455/466 |
| 2010/0322391 | A1 * | 12/2010 | Michaelis | H04M 3/42391 |
| | | | | 370/352 |
| 2011/0258266 | A1 * | 10/2011 | Serra | H04W 76/50 |
| | | | | 709/227 |
| 2012/0052832 | A1 * | 3/2012 | Bleckert | H04W 12/069 |
| | | | | 455/404.1 |
| 2012/0320912 | A1 * | 12/2012 | Estrada | H04L 67/146 |
| | | | | 370/389 |
| 2014/0099909 | A1 * | 4/2014 | Daly | H04W 4/14 |
| | | | | 455/466 |
| 2014/0148117 | A1 * | 5/2014 | Basore | H04W 4/90 |
| | | | | 455/404.1 |
| 2014/0282934 | A1 * | 9/2014 | Miasnik | H04W 4/02 |
| | | | | 726/5 |
| 2015/0373199 | A1 * | 12/2015 | Zitnik | H04M 3/567 |
| | | | | 370/260 |
| 2016/0150574 | A1 * | 5/2016 | Edge | H04L 61/2564 |
| | | | | 455/404.2 |
| 2017/0150335 | A1 * | 5/2017 | Self | H04M 3/42357 |
| 2017/0374538 | A1 * | 12/2017 | Gellens | H04W 4/48 |
| 2018/0176876 | A1 * | 6/2018 | Alam | H04W 60/00 |
| 2021/0306836 | A1 * | 9/2021 | Ekl | H04W 4/02 |
| 2022/0174462 | A1 * | 6/2022 | Chockalingam | H04W 4/90 |
| 2023/0156447 | A1 * | 5/2023 | Hooker | H04W 64/00 |
| | | | | 455/404.2 |

* cited by examiner

400

402 — Communicate an emergency message to RCS Proxy

404 — Relay the emergency message to ECS Complex

406 — Communicate a response message

408 — Determine that the UE is RCS enabled

410 — Establish a TCP/TLS connection with PSAP via RCS capabilities

412 — Enable end-to-end voice and chat communications via the TCP/TLS connection

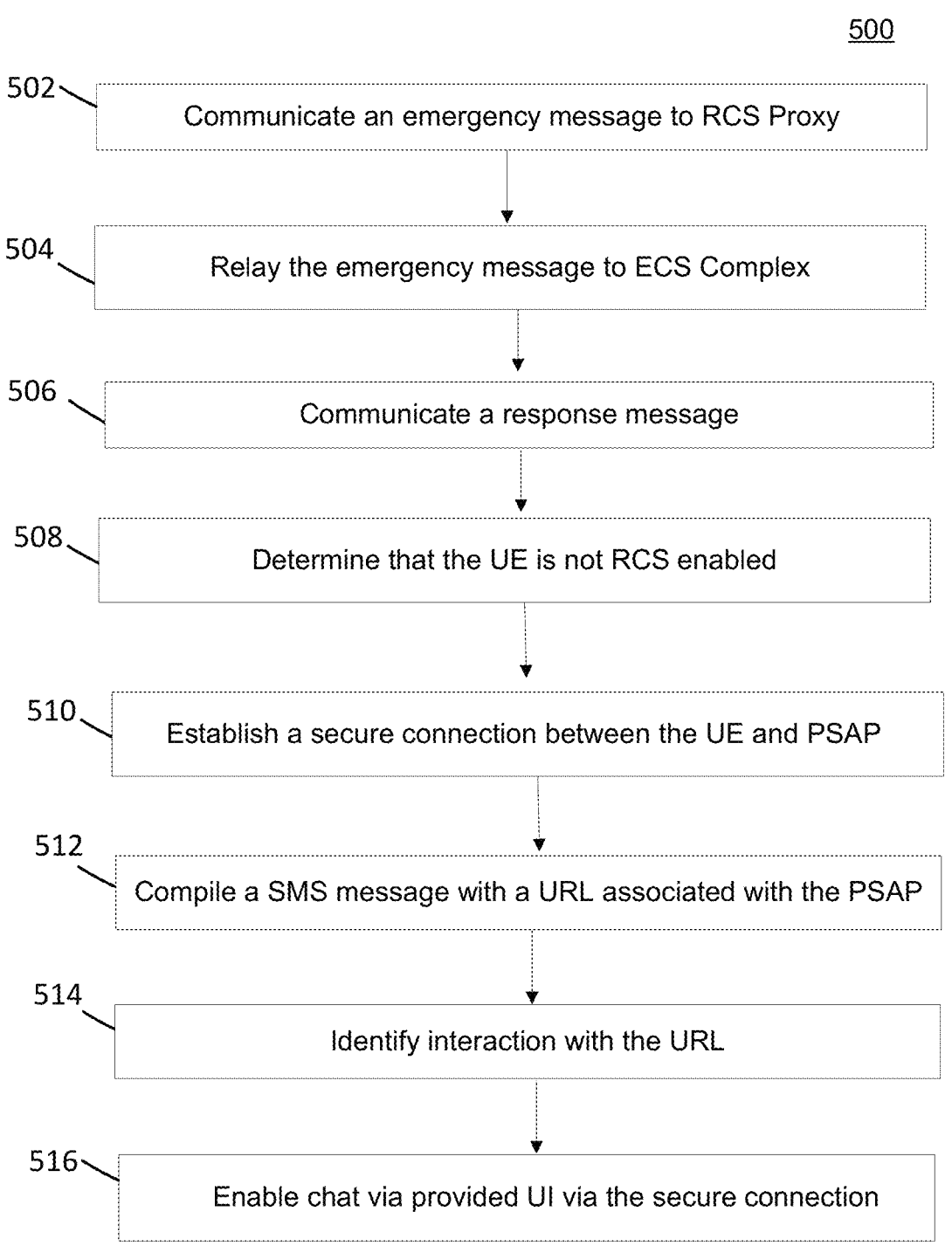

502 — Communicate an emergency message to RCS Proxy

504 — Relay the emergency message to ECS Complex

506 — Communicate a response message

508 — Determine that the UE is not RCS enabled

510 — Establish a secure connection between the UE and PSAP

512 — Compile a SMS message with a URL associated with the PSAP

514 — Identify interaction with the URL

516 — Enable chat via provided UI via the secure connection

FIG. 5

RCS PROXY SYSTEM AND METHOD FOR PSAP SESSIONS

BACKGROUND

Public Safety Answering Points (PSAPs) are responsible for handling and routing emergency calls (e.g., 911 calls, for example). PSAP functionality operates by connecting emergency calls to a dispatcher that routes the call to a local emergency service or municipality (e.g., medical, fire and/or law enforcement agencies).

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 illustrates an exemplary workflow according to some embodiments of the present disclosure;

DETAILED DESCRIPTION OF EXAMPLE EMBODIMENTS

The disclosed systems and methods provide a Rich Communication Services (RCS) Proxy as a novel network element that provides mechanisms for establishing and enabling emergency communications. RCS, as enabled via the disclosed RCS proxy discussed herein, is a communication protocol for telephone and network carriers that enables service discovery and can transmit in-call multimedia. RCS functions as part of an Internet Protocol (IP) Multimedia Core Network Subsystem (IMS), which is an architectural framework for delivering IP multimedia services.

As discussed herein, RCS functionality enables advantages over existing short message/messaging service (SMS)-based systems. For example, the disclosed RCS framework, among other advantages, does not have a character limit for messages, can enable sharing of large-sized content files (e.g., images, video and the like), can enable a geo-push (e.g., send location commands), can provide delivered/seen/typing reporting, is IP-based and can enable end-to-end encryption. In some embodiments, RCS can be natively supported by a device (e.g., Android® devices, for example).

According to some embodiments, the disclosed RCS framework can facilitate simultaneous voice and chat features for an emergency services caller (e.g., a user on a mobile device—for example, a smartphone). In some embodiments, as discussed below, with Session Initiation Protocol (SIP) and Hypertext Transfer Protocol Secure (HTTPS) interfaces, the disclosed RCS framework can function to automatically establish an emergency chat session for RCS-capable devices. For devices that are not configured with RCS capabilities, the disclosed framework can function to provide a uniform resource locator (URL) via a SMS message, such that via interaction with the URL, an internet session with the PSAP can be established.

Conventional voice and emergency SMS services exist on separate platforms and operate in a mutually exclusive manner; however, via the disclosed RCS framework, the disclosed systems and methods provide novel network elements and configurations that can align voice and chat communications between interacting entities (e.g., a user caller and a dispatcher at the PSAP handling the incoming call).

Figure 1:
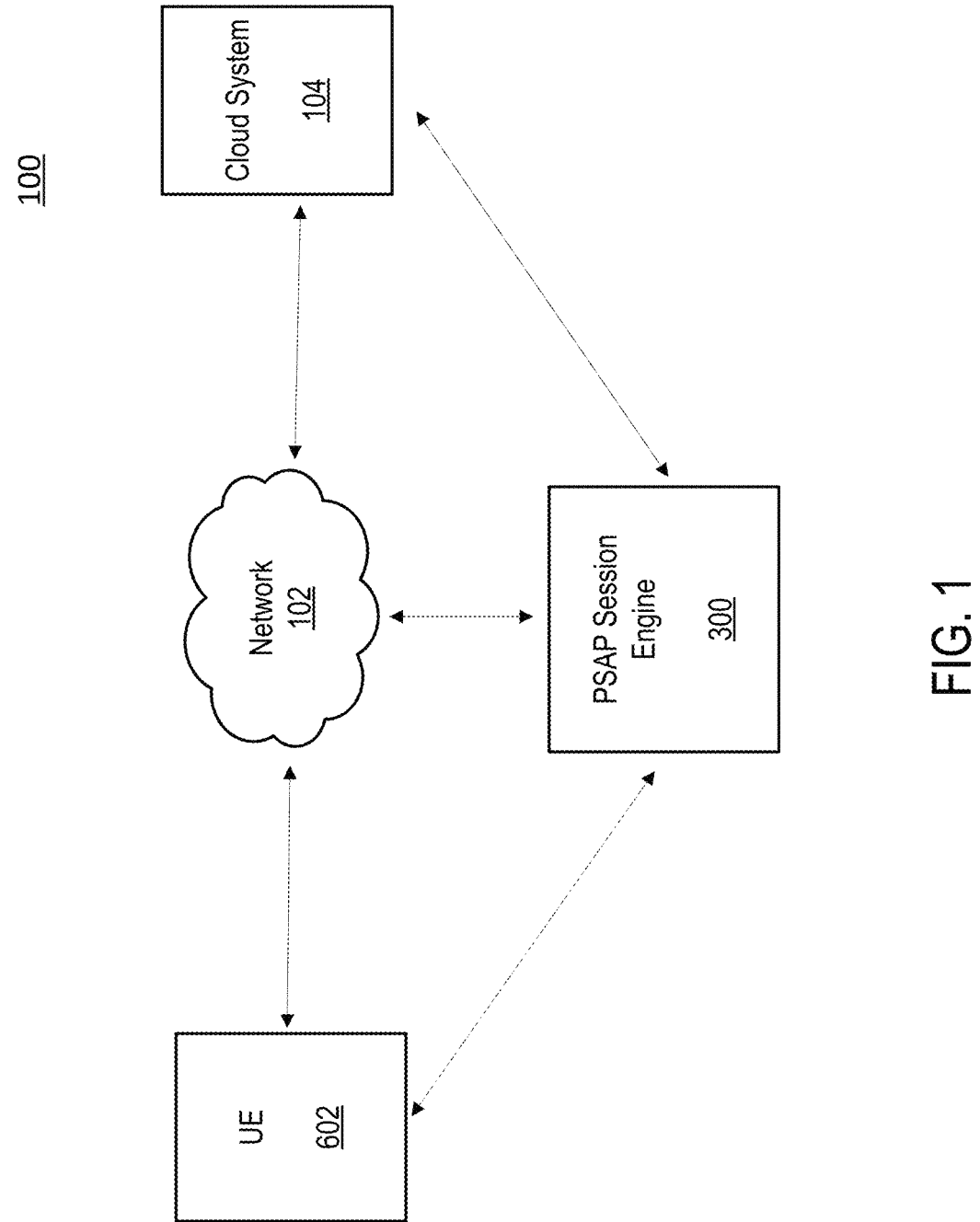
FIG. 1 is a block diagram of an example configuration within which the systems and methods disclosed herein could be implemented according to some embodiments of the present disclosure.

With reference to FIG. 1, system 100 is depicted which includes user equipment (UE) 602, network 102, cloud system 104 and public safety answering points (PSAP) session engine 300. UE 602 can be any type of device, such as, but not limited to, a mobile phone, tablet, laptop, Internet of Things (IoT) device, autonomous machine, and any other device equipped with touch screen display. Further discussion of UE 602 is provided below in reference to FIGS. 6 and 7.

Network 102 can be any type of network, such as, but not limited to, a wireless network, cellular network, the Internet, and the like. Network 102 facilitates connectivity of the components of system 100, as illustrated in FIG. 1. A further discussion of the network configuration and type of network is provided below in reference to FIG. 6.

Cloud system 104 can be any type of cloud operating platform and/or network-based system upon which applications, operations, and/or other forms of network resources can be located. For example, system 104 can be a service provider and/or network provider from where applications can be accessed, sourced or executed from. For example, system 104 can correspond to Verizon® services. In another example, system 104 can provide IMS architecture, as discussed below in relation to FIG. 2.

In some embodiments, cloud system 104 can include a server(s) and/or a database of information which is accessible over network 102. In some embodiments, a database (not shown) of cloud system 104 can store a dataset of data and metadata associated with local and/or network information related to a user(s) of UE 602 and the UE 602, and the services, applications, content rendered and/or executed by UE 602.

Figure 3:
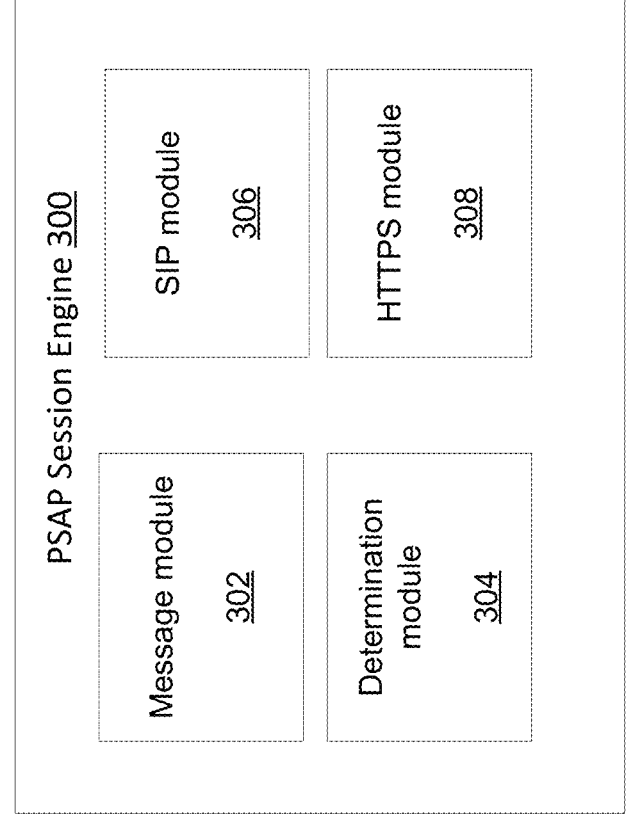
FIG. 3 is a block diagram illustrating components of an exemplary system according to some embodiments of the present disclosure.

PSAP session engine 300, as discussed herein and further in FIG. 3, includes components for PSAP session connectivity and communications. PSAP session engine 300 can be a special purpose machine or processor, and could be hosted by a device or network component within cloud system 104, on network 102 and/or on UE 602.

According to some embodiments, as discussed above, PSAP session engine 300 can function as an application installed on UE 602 as provided by cloud system 104. In some embodiments, such application can be a web-based application accessed by UE 602 over network 102 from cloud system 104 (e.g., as indicated by the connection between network 102 and engine 300, and/or the dashed line between UE 602 and engine 300 in FIG. 1). In some embodiments, engine 300 can be configured and/or installed as an augmenting script, program or application (e.g., a plug-in or extension) to another application or program executing on UE 602.

As illustrated in FIG. 3, according to some embodiments, PSAP session engine 300 includes message module 302, determination module 304, SIP module 306 and HTTPS module 308. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 300 and each of its modules, and their role within embodiments of the present disclosure will be discussed below.

Figure 2:
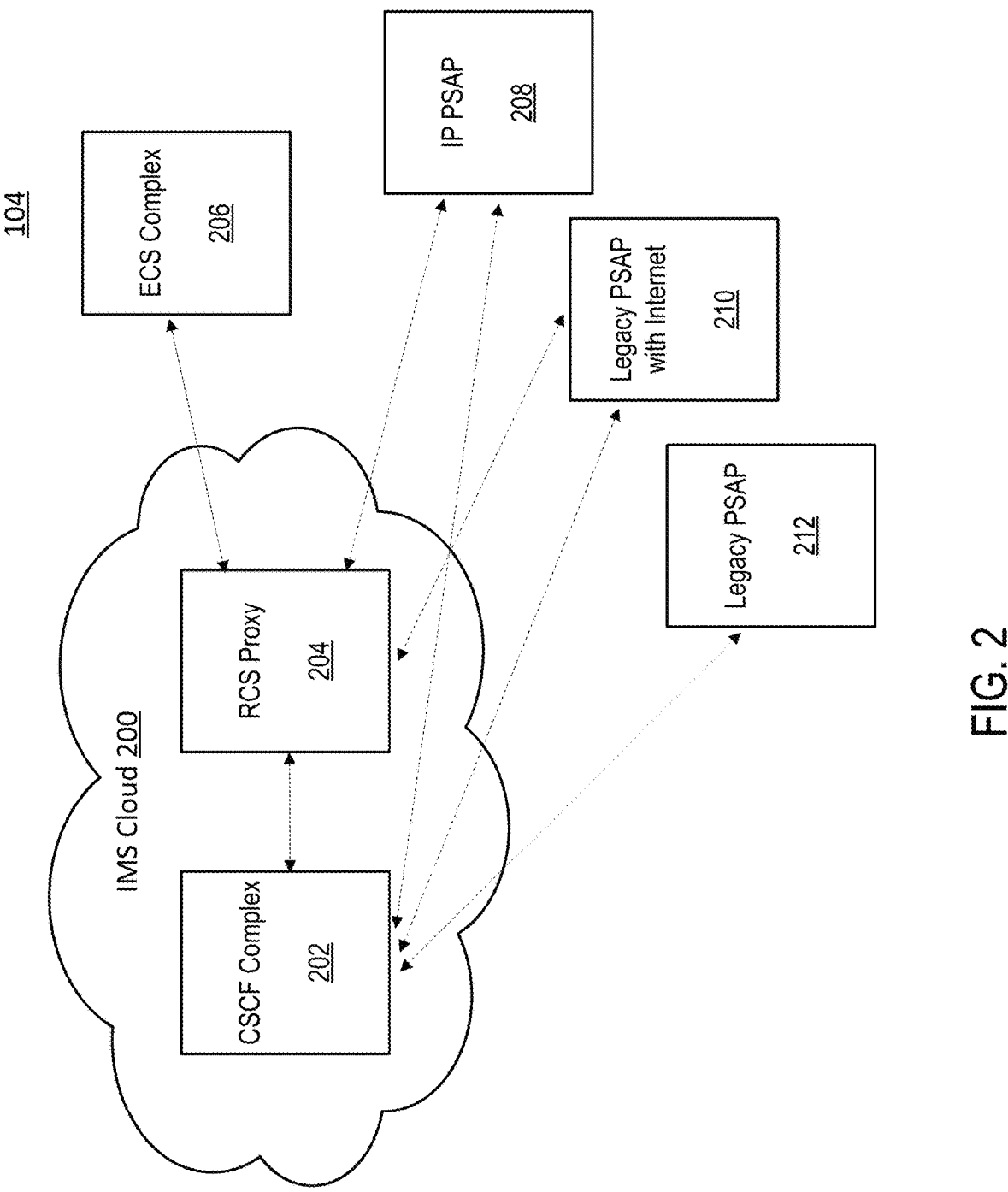
FIG. 2 is a block diagram of an example network configuration according to some embodiments of the present disclosure.

Turning to FIG. 2, depicted is a non-limiting example of a network environment for cloud system 104. As illustrated in FIG. 2, cloud system 104 can include IMS cloud 200 (e.g., IMS core network), and network components for an emergency communication system (ECS) complex 206, IP PSAP 208, legacy PSAP with Internet 210 and legacy PSAP 212. IMS cloud 200 can include components for a call session control function (CSCF) complex 202 and proxy 204 (e.g., a RCS proxy, as referred to herein).

As provided below, the IMS cloud 200, and as a result the RCS proxy 204, can be configured within a network as positioned in front of the ECS complex 206, and function as a SIP passthrough for 911 calls. The RCS proxy 204 can also trigger and handle (e.g., relay to the CSCF complex 202, for example) redirection responses from the ECS complex 206 (e.g., Invite and 300 Multiple Choices messages, for example).

In some embodiments, the CSCF complex 202 provides the central control functions in the IMS cloud 200 for setting up, establishing, modifying and/or disabling multimedia sessions for a UE(s) (e.g., UE 602, for example).

In some embodiments, ECS complex 206 can provide emergency dispatcher services for SIP connectivity between UE 602 and the IP PSAP 208. In some embodiments, IP PSAP 208 is the network component for an IP-enabled PSAP that functions via an RCS connection with an RSC enabled device, as discussed above and in more detail below at least in relation to Process 400 of FIG. 4.

In some embodiments PSAPs 210 and 212 can operate to enable sessions for non-RCS enabled devices (and non-RCS sessions managed via CSCF complex 202). In some embodiments, legacy PSAP with Internet 210 can enable a chat session via an interacted URL link, as discussed below in relation to Process 500 of FIG. 5. In some embodiments, legacy PSAP 212 can function for establishing voice connectivity for non-RCS devices (e.g., voice or cellular only capabilities, for example), as also discussed below in relation to FIG. 5.

Further discussion and disclosure of each of the cloud system 104 components (200-212), and their respective functionalities are provided below in relation to the steps of Process 400 of FIG. 4 and Process 500 of FIG. 5.

Figure 4:
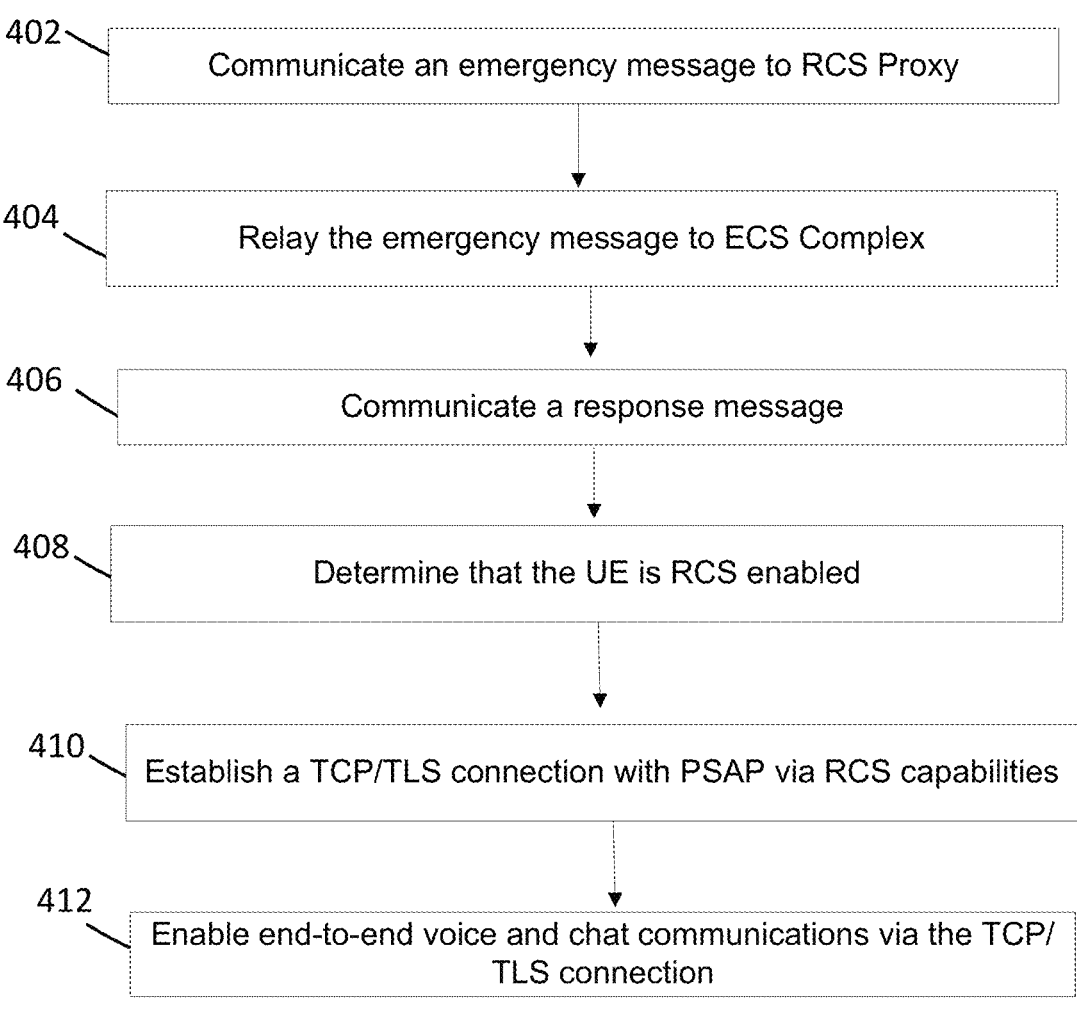
FIG. 4 illustrates an exemplary workflow according to some embodiments of the present disclosure.

FIG. 4 provides Process 400 which details embodiments for RCS enabled connectivity and interactions with a PSAP. FIG. 5 provides Process 500 which details embodiments for connectivity and interactions between a UE and PSAP when the UE is non-RCS enabled.

In FIG. 4, according to some embodiments, Steps 402-406 of Process 400 can be performed by message module 300 of PSAP session engine 300; Step 408 can be performed by determination module 304; and Steps 410-412 can be performed by SIP module 306.

According to some embodiments, Process 400 begins with Step 402 where an emergency message (e.g., a 911 message, for example) is received from a user device (e.g., UE 602) and communicated to the RCS proxy 204. In some embodiments, the CSCF complex 202 can receive the message from the UE 602 and relay it to the RCS proxy 204. In some embodiments, the message can comprise a response code: "Invite", which can trigger the ECS complex 206 to respond accordingly, as discussed below.

In Step 404, the received message is relayed from the RCS proxy 204 to the ECS complex 206. Accordingly, in some embodiments, the relay can involve transmitting the "Invite" message triggering the ECS complex 206 to respond.

In Step 406, in response to the "Invite" message, the ECS complex 206 provides/communicates a response message. For example, the response message can include a redirect response code such as for example the HTTP 300 Multiple Choices redirection response, where several address options for local emergency services can be listed within the body or the message's contact fields. For example, international mobile equipment identity (IMEI) numbers for local emergency municipalities, services and/or departments can be listed within the message, as determined via geographical information of the UE caller and/or IMEI of the UE 602.

In Step 408, the CSCF complex 202 can determine that the UE 602 is RCS enabled. In some embodiments, such determination can be based on header information contained with the message(s) communicated by UE 602. In some embodiments, message headers can include SIP registration data, which provides the requisite indicators as to the device's RCS-enabled status. As such, in some embodiments, in Step 408, upon receiving the response message (e.g., 300 Multiple Choices response) from the ECS complex 206, CSCF complex 202 can parse and analyze the message information from the UE 602 and determine that SIP registration data/information is included therein. In some embodiments, such SIP registration data/information can include RCS elements (e.g., chat, "largemsg", geo-push, and the like).

In some embodiments, the SIP determination performed in Step 408 can involve the RCS proxy 204 querying the CSCF complex 202 for information that the CSCF complex 202 has stored for the UE, which was generated/stored during initial registration of the UE.

In Step 410, according to some embodiments, when the UE 602 is determined to be RSC enabled, a SIP-subscribe instruction can be enacted which can establish a SIP-based transport layer security/transmission control protocol (TCP/TLS) connection with the PSAP (e.g., PSAP 208).

According to some embodiments, the PSAP 208 or legacy PSAP with Internet 210 can initiate the connection to the HTTPS/IP components of the RCS Proxy 204. After a connection is established, the PSAP 208 can provide information to the RCS proxy 204 related to the UE/user's information (e.g., MDN), which enables the RCS proxy 204 to connect (e.g., "tie-together" and/or align) the two sides of a conversion (e.g., chat and voice). In some embodiments, Step 410 can involve the PSAP 208 establishing a HTTPS/IP connection after a voice call with the UE is connected.

According to some embodiments, determinations and embodiments for non-RCS enabled devices and connections are discussed below in relation to FIG. 5.

In Step 412, engine 300 can enable end-to-end voice and chat communications via the established PSAP connection (from Step 410). Accordingly, in some embodiments, via the TCP/TLS connection, SIP and RSC messaging can be passed end-to-end from the UE 602 to the PSAP.

Turning to FIG. 5, according to some embodiments, Steps 502-506 of Process 500 can be performed by message module 300 of PSAP session engine 300; Step 508 can be performed by determination module 304; and Steps 510-516 can be performed by HTTPS module 308.

According to some embodiments, Process 500 begins with Steps 502, 504 and 506, which are performed in a similar manner as discussed above in relation to Steps 402, 404 and 406 of Process 400, respectively.

In Step 508, a determination is made regarding the RCS capabilities of the requesting UE 602, which can be performed in a similar manner as discussed above at least in relation to Step 408. That is, in Step 408 of Process 400 above, UE 602 is determined to be RCS capable via SIP information provided for the UE 602 via CSCF complex 202; however, in the embodiments discussed herein in relation to Process 500, in Step 508, it is determined that the UE 602 is not RCS enabled. According to some embodiments, such determination can involve the CSCF complex 202 responding to a query from the RCS proxy 204 indicating that the registration information stored therein indicates that the UE is not RCS-enabled. In some embodiments, such processing can involve the identification that only voice and/or VOLTE contact information is included therein.

In Step 510, a secure connection (e.g., an HTTPS connection) between the UE 602 and the PSAP (e.g., legacy PSAP with Internet 210) can be established, as discussed above. In some embodiments, Step 510 can involve the compilation of URL information (for the legacy PSAP with Internet 210) and the MDN of the UE. As provided below, such processing enables the RCS proxy 204 to generate the SMS message that includes the URL for communication to the UE 602.

In Step 512, engine 300 can compile a SMS message that includes the URL associated with the PSAP (e.g., legacy PSAP with Internet 210). For example, the URL can act as a pointer to the network location of the PSAP. In some embodiments, as discussed above, interaction with the URL enables chat connectivity and can provide a user interface (UI) for such chat functionality. Step 512 further involves communication of such URL message to the UE 602.

In Step 514, identification of an interaction with the URL is performed. In some embodiments, such interaction can be based on the URL message being opened, whereby selection/interaction with the URL is effectuated therefrom via UE 602.

In Step 516, as a result of the connection established in Step 510, and the interaction with the URL (in Step 514) chat functionality can be provided to UE 602 for chat interactions with a dispatcher at the PSAP 210. Accordingly, engine 300 can provide end-to-end communication between a UE 602 and PSAP 210 via an internet connection despite the lack of RCS capabilities.

In some embodiments, for non-RSC devices, in Step 516, a voice connection with the PSAP 212 may remain on the circuit path, while the chat session with PSAP 210 can exist over the secure connection. Thus, each PSAP dispatcher can have a unique URL and/or active session per caller so as to enable the matching/alignment of a voice call with a chat session.

Figure 6:
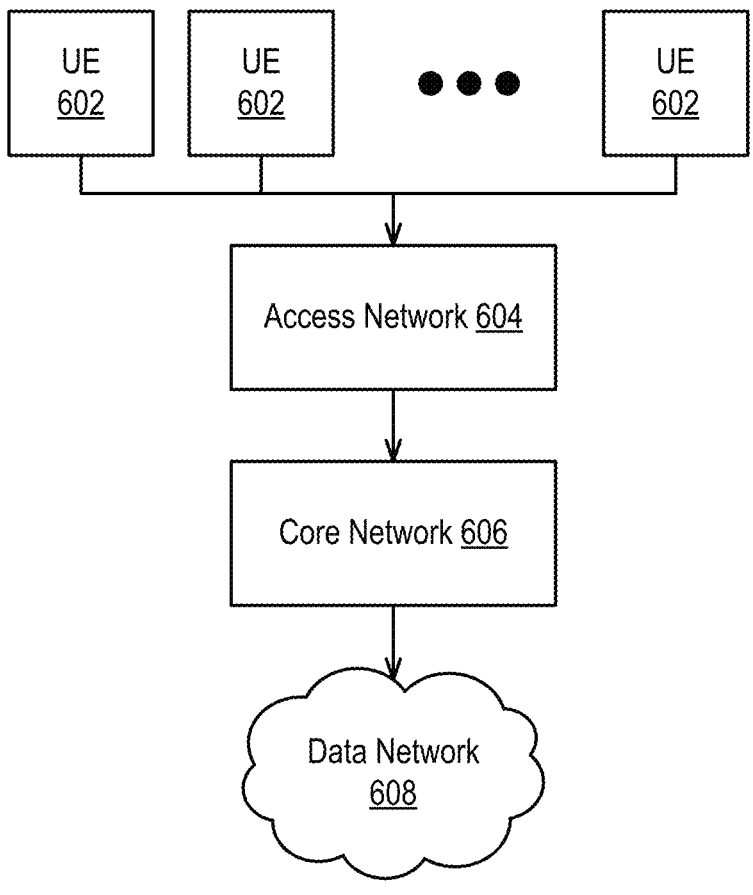
FIG. 6 is a block diagram of an example network architecture according to some embodiments of the present disclosure.

FIG. 6 is a block diagram of an example network architecture according to some embodiments of the present disclosure. In the illustrated embodiment, UE 602 accesses a data network 608 via an access network 604 and a core network 606. In the illustrated embodiment, UE 602 comprises any computing device capable of communicating with the access network 604. As examples, UE 602 may include mobile phones, tablets, laptops, sensors, IoT devices, autonomous machines, unmanned aerial vehicles (UAVs), wired devices, wireless handsets, and any other devices equipped with a cellular or wireless or wired transceiver. One non-limiting example of a UE 602 is provided in FIG. 7.

In the illustrated embodiment of FIG. 6, the access network 604 comprises a network allowing network communication with UE 602. In general, the access network 604 includes at least one base station that is communicatively coupled to the core network 606 and coupled to zero or more UE 602.

In some embodiments, the access network 604 comprises a cellular access network, for example, a fifth-generation (5G) network or a fourth-generation (4G) network. In one embodiment, the access network 604 can comprise a Next-Gen Radio Access Network (NG-RAN), which can be communicatively coupled to UE 602. In an embodiment, the access network 604 may include a plurality of base stations (e.g., eNodeB (eNB), gNodeB (gNB)) communicatively connected to UE 602 via an air interface. In one embodiment, the air interface comprises a New Radio (NR) air interface. For example, in a 5G network, UE 602 can be communicatively coupled to each other via an X2 interface.

In the illustrated embodiment, the access network 604 provides access to a core network 606 to the UE 602. In the illustrated embodiment, the core network may be owned and/or operated by a network operator (NO) and provides wireless connectivity to UE 602 via access network 604. In the illustrated embodiment, this connectivity may comprise voice and data services.

At a high-level, the core network 606 may include a user plane and a control plane. In one embodiment, the control plane comprises network elements and communications interfaces to allow for the management of user connections and sessions. By contrast, the user plane may comprise network elements and communications interfaces to transmit user data from UE 602 to elements of the core network 606 and to external network-attached elements in a data network 608 such as, but not limited to, the Internet, a local area network (LAN), a wireless LAN, a wide area network (WAN), a mobile edge computing (MEC) network, a private network, a cellular network, and the like.

In the illustrated embodiment, the access network 604 and the core network 606 may be operated by a NO. However, in some embodiments, the networks (604, 606) may be operated by a private entity, different entities, and the like, and may be closed to public traffic. In these embodiments, the operator of the device can simulate a cellular network, and UE 602 can connect to this network similar to connecting to a national or regional network.

Figure 7:
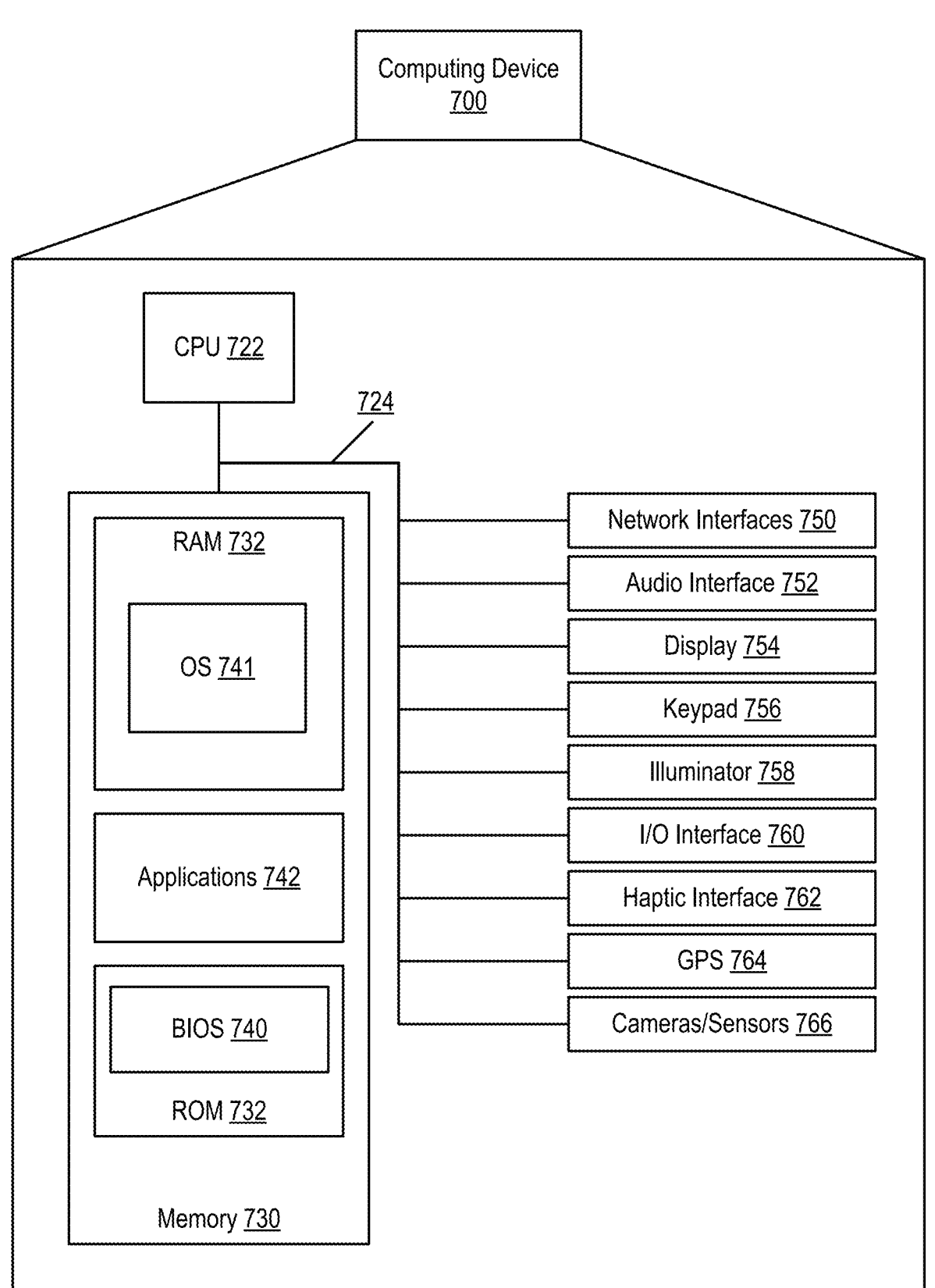
FIG. 7 is a block diagram illustrating a computing device showing an example of a client or server device used in various embodiments of the present disclosure.

FIG. 7 is a block diagram illustrating a computing device 700 showing an example of a client or server device used in the various embodiments of the disclosure. Computing device 700 can be a representation of UE 602, as discussed above.

The computing device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, GPS receivers 764, or cameras/sensors 766. Some devices may include additional components not shown, such as graphics processing unit (GPU) devices, cryptographic co-processors, artificial intelligence (AI) accelerators, or other peripheral devices.

As shown in FIG. 7, the device 700 includes a central processing unit (CPU) 722 in communication with a mass memory 730 via a bus 724. The computing device 700 also includes one or more network interfaces 750, an audio interface 752, a display 754, a keypad 756, an illuminator 758, an input/output interface 760, a haptic interface 762, an optional GPS receiver 764 (and/or an interchangeable or additional GNSS receiver) and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741 for controlling the operation of the computing device 700.

Applications 742 may include computer-executable instructions which, when executed by the computing device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them to RAM 732 again.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a digit from a human hand.

Keypad 756 may comprise any input device arranged to receive input from a user. Illuminator 758 may provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The optional GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claime is:

1. A method comprising:
receiving, by a processor, an emergency message from a user device;
receiving, by the processor, based on the emergency message, a response message comprising information related to a set of emergency municipalities located relative to the user device;
analyzing, by the processor, the emergency message, and determining, based on the analysis, Rich Communication Services (RCS) capabilities of the user device;
establishing, by the processor, a connection between the user device and a Public Safety Answering Point (PSAP) based on the RCS capability determination of the user device, such that:
when the user device is determined to be RCS enabled, the established connection comprises an RCS connection with an RCS-based PSAP, and
when the user device is determined to be non-RCS enabled, the established connection comprises an internet connection and a voice connection with an internet-based PSAP, the internet connection being on a secure channel and comprising chat functionality with the internet-based PSAP, the voice connection being on a circuit path and comprising cellular functionality with the internet-based PSAP, the internet connection with the internet-based PSAP being established by:
identifying, by the processor, a network location of the internet-based PSAP,
compiling, by the processor, a short message service (SMS) message comprising a selectable uniform resource locator (URL) for the network location,
communicating the compiled SMS message to the user device, and
identifying, by the processor, a selection of the selectable URL by a user of the user device; and
enabling, by the processor, end-to-end communication for the user device based on the established connection and the determined RCS capabilities of the user device.

2. The method of claim 1, further comprising:
parsing the emergency message;
identifying a header in the emergency message based on the parsing;
analyzing the header; and
determining a type of information included in the header.

3. The method of claim 2, further comprising:
identifying the type of information as Session Initiation Protocol (SIP) registration information, wherein the SIP registration information indicates that the user device is RCS enabled.

4. The method of claim 2, further comprising:
identifying the type of information as at least one of voice and VoLTE contact information, wherein the voice and VOLTE contact information indicates that the user device is not RCS enabled.

5. The method of claim 1, wherein the RCS connection comprises a Session Initiation Protocol (SIP)-based transport layer security/transmission control protocol (TCP/TLS) connection.

6. The method of claim 1, wherein the information within the response message comprises international mobile equipment identity (IMEI) numbers for each of the municipalities within the set of emergency municipalities.

7. The method of claim 1, wherein each municipality within the set of emergency municipalities are local municipalities to a user of the user device.

8. The method of claim 1, wherein the emergency message corresponds to a 911 message.

9. A device comprising:

a processor configured to:

receive an emergency message from a user device;

receive, based on the emergency message, a response message comprising information related to a set of emergency municipalities located relative to the user device;

analyze the emergency message, and determine, based on the analysis, Rich Communication Services (RCS) capabilities of the user device;

establish a connection between the user device and a Public Safety Answering Point (PSAP) based on the RCS capability determination of the user device, such that:

when the user device is determined to be RCS enabled, the established connection comprises an RCS connection with an RCS-based PSAP, and when the user device is determined to be non-RCS enabled, the established connection comprises an internet connection and a voice connection with an internet-based PSAP, the internet connection being on a secure channel and comprising chat functionality with the internet-based PSAP, the voice connection being on a circuit path and comprising cellular functionality with the internet-based PSAP, the internet connection with the internet-based PSAP being established by:

identifying a network location of the internet-based PSAP, compiling a short message service (SMS) message comprising a selectable uniform resource locator (URL) for the network location, communicating the compiled SMS message to the user device, and identifying a selection of the selectable URL by a user of the user device; and enable end-to-end communication for the user device based on the established connection and the determined RCS capabilities of the user device.

10. The device of claim 9, wherein the processor is further configured to:

parse the emergency message;

identify a header in the emergency message based on the parsing;

analyze the header; and determine a type of information included in the header.

11. The device of claim 10, wherein the processor is further configured to:

identify the type of information as Session Initiation Protocol (SIP) registration information, wherein the SIP registration information indicates that the user device is RCS enabled.

12. The device of claim 10, wherein the processor is further configured to:

identify the type of information as at least one of voice and VoLTE contact information, wherein the voice and VoLTE contact information indicates that the user device is not RCS enabled.

13. The device of claim 9, wherein the RCS connection comprises a Session Initiation Protocol (SIP)-based transport layer security/transmission control protocol (TCP/TLS) connection.

14. A non-transitory computer-readable medium tangibly encoded with instructions, that when executed by a processor, perform a method comprising:

receiving, by the processor, an emergency message from a user device;

receiving, by the processor, based on the emergency message, a response message comprising information related to a set of emergency municipalities located relative to the user device;

analyzing, by the processor, the emergency message, and determining, based on the analysis, Rich Communication Services (RCS) capabilities of the user device;

establishing, by the processor, a connection between the user device and a Public Safety Answering Point (PSAP) based on the RCS capability determination of the user device, such that:

when the user device is determined to be RCS enabled, the established connection comprises an RCS connection with an RCS-based PSAP, and when the user device is determined to be non-RCS enabled, the established connection comprises an internet connection and a voice connection with an internet-based PSAP, the internet connection being on a secure channel and comprising chat functionality with the internet-based PSAP, the voice connection being on a circuit path and comprising cellular functionality with the internet-based PSAP, the internet connection with the internet-based PSAP being established by:

identifying, by the processor, a network location of the internet-based PSAP, compiling, by the processor, a short message service (SMS) message comprising a selectable uniform resource locator (URL) for the network location, communicating the compiled SMS message to the user device, and identifying, by the processor, a selection of the selectable URL by a user of the user device; and enabling, by the processor, end-to-end communication for the user device based on the established connection and the determined RCS capabilities of the user device.

15. The non-transitory computer-readable medium of claim 14, further comprising:

parsing the emergency message;

identifying a header in the emergency message based on the parsing;

analyzing the header; and determining a type of information included in the header.

16. The non-transitory computer-readable medium of claim 15, further comprising:

identifying the type of information as Session Initiation Protocol (SIP) registration information, wherein the SIP registration information indicates that the user device is RCS enabled.

17. The non-transitory computer-readable medium of claim 15, further comprising:

identifying the type of information as at least one of voice and VoLTE contact information, wherein the voice and VoLTE contact information indicates that the user device is not RCS enabled.

* * * * *